(12) United States Patent
Millett

(10) Patent No.: US 9,630,381 B2
(45) Date of Patent: Apr. 25, 2017

(54) INSULATION SYSTEM FOR A COOKING APPLIANCE INCORPORATING A PLURALITY OF MICROSPHERE SHEETS

(71) Applicant: Whirlpool Corporation, Benton Harbor, MI (US)

(72) Inventor: Frederick A. Millett, Grand Haven, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 14/709,896

(22) Filed: May 12, 2015

(65) Prior Publication Data

US 2016/0332427 A1 Nov. 17, 2016

(51) Int. Cl.
| | |
|---|---|
| B32B 27/08 | (2006.01) |
| B32B 27/28 | (2006.01) |
| B32B 5/32 | (2006.01) |
| B32B 27/20 | (2006.01) |
| F24C 15/34 | (2006.01) |

(52) U.S. Cl.
CPC ............. *B32B 27/08* (2013.01); *B32B 27/20* (2013.01); *B32B 27/283* (2013.01); *F24C 15/34* (2013.01); *B32B 2264/101* (2013.01); *B32B 2305/026* (2013.01); *B32B 2305/028* (2013.01); *B32B 2307/304* (2013.01); *B32B 2509/00* (2013.01)

(58) Field of Classification Search
CPC .... B32B 27/283; B32B 5/32; B32B 2264/101
See application file for complete search history.

(56) References Cited

U.S. PATENT DOCUMENTS

| | | | |
|---|---|---|---|
| 3,607,169 A | 9/1971 | Coxe | |
| 3,614,388 A | 10/1971 | Robinson | |
| 4,269,628 A | 5/1981 | Ballard et al. | |
| 4,548,196 A | 10/1985 | Torobin | |
| 4,590,360 A | 5/1986 | Maitenaz et al. | |
| 5,157,893 A * | 10/1992 | Benson ................. | A47J 27/002 52/406.3 |
| 5,175,975 A | 1/1993 | Benson et al. | |
| 6,348,118 B1 | 2/2002 | Johnson et al. | |

(Continued)

FOREIGN PATENT DOCUMENTS

| | | |
|---|---|---|
| EP | 0012038 | 6/1980 |
| EP | 0110143 | 6/1984 |

(Continued)

*Primary Examiner* — Hai Vo

(57) ABSTRACT

An appliance includes an outer shell and an inner shell, wherein the outer shell and the inner shell are engaged to define an insulating cavity therebetween, and wherein the inner shell includes an inner surface that defines an interior cavity. An insulation member includes a plurality of layers, each layer of the plurality of layers including an insulative sheet defining first and second surfaces and a plurality of microspheres at least partially disposed within the insulative sheet, wherein at least a portion of the plurality of microspheres extends outward from each of the first and second surfaces to define a plurality of protrusions, and wherein the engagement of two adjacent layers of the plurality of layers causes a portion of the plurality of protrusions to engage and define a plurality of insulating air pockets between the adjacent layers.

6 Claims, 5 Drawing Sheets

(56) References Cited

U.S. PATENT DOCUMENTS

| | | |
|---|---|---|
| 6,408,841 B1 | 6/2002 | Hirath et al. |
| 6,858,280 B2 | 2/2005 | Allen et al. |
| 7,037,865 B1 | 5/2006 | Kimberly |
| 7,794,805 B2 | 9/2010 | Aumaugher et al. |
| 8,132,382 B2 | 3/2012 | Wagner et al. |
| 2011/0206923 A1 | 8/2011 | Liu et al. |
| 2012/0126164 A1 | 5/2012 | Cooray |
| 2013/0040073 A1 | 2/2013 | Pett et al. |
| 2013/0213386 A1 | 8/2013 | Gabel et al. |
| 2014/0141676 A1 | 5/2014 | Crandall et al. |
| 2015/0011675 A1 | 1/2015 | Fukaumi et al. |

FOREIGN PATENT DOCUMENTS

| | | |
|---|---|---|
| FR | 2115665 | 7/1972 |
| GB | 2431974 | 5/2007 |
| JP | 2008240507 | 10/2008 |

\* cited by examiner

INSULATION SYSTEM FOR A COOKING APPLIANCE INCORPORATING A PLURALITY OF MICROSPHERE SHEETS

FIELD OF THE DEVICE

The device is in the field of insulation systems for cooking appliances, specifically, an insulation system incorporating microsphere sheets placed in layers to form the insulation system.

SUMMARY

In at least one aspect, an appliance includes an outer shell and an inner shell, wherein the outer shell and the inner shell are engaged to define an insulating cavity therebetween, and wherein the inner shell includes an inner surface that defines an interior cavity. An insulation member includes a plurality of layers, each layer of the plurality of layers including an insulative sheet defining first and second surfaces and a plurality of microspheres at least partially disposed within the insulative sheet. At least a portion of the plurality of microspheres extends outward from each of the first and second surfaces to define a plurality of protrusions, and wherein the engagement of two adjacent layers of the plurality of layers causes a portion of the pluralities of protrusions of the respective two adjacent layers to engage and define a plurality of insulating air pockets between the adjacent layers.

In at least another aspect, an insulation member for an appliance includes a plurality of microsphere sheets disposed in a layered configuration, wherein each microsphere sheet includes a plurality of microspheres disposed in a layer of a flexible base material. At least a portion of the plurality of microspheres extends outward from the flexible base material to define first and second sets of microsphere protrusions on first and second sides of the flexible base material. The first set of microsphere protrusions of a first microsphere sheet of the plurality of microsphere sheets engages the second set of microsphere protrusions of an adjacent microsphere sheet of the plurality of microsphere sheets to define a plurality of insulative air pockets defined between the first and adjacent microsphere sheets.

In at least another aspect, a method for forming an insulative layer for an appliance includes disposing a plurality of microspheres within a flexible base material, forming the flexible base material with the plurality of microspheres disposed therein into plurality of microsphere sheets. Each of the plurality of microsphere sheets includes a plurality of protrusions that extend outward from the surface of each microsphere sheet, and wherein each of the protrusions is defined by a microsphere of the plurality of microspheres. The method also includes layering the plurality of microsphere sheets. A portion of the plurality of protrusions of a first microsphere sheet substantially engages a portion of the plurality of protrusions of a second microsphere sheet such that a plurality of insulating air pockets are formed between the first and second microsphere sheets. The layered plurality of microsphere sheets forms an insulation member for an appliance.

These and other features, advantages, and objects of the present device will be further understood and appreciated by those skilled in the art upon studying the following specification, claims, and appended drawings.

DETAILED DESCRIPTION OF EMBODIMENTS

Figure 1:
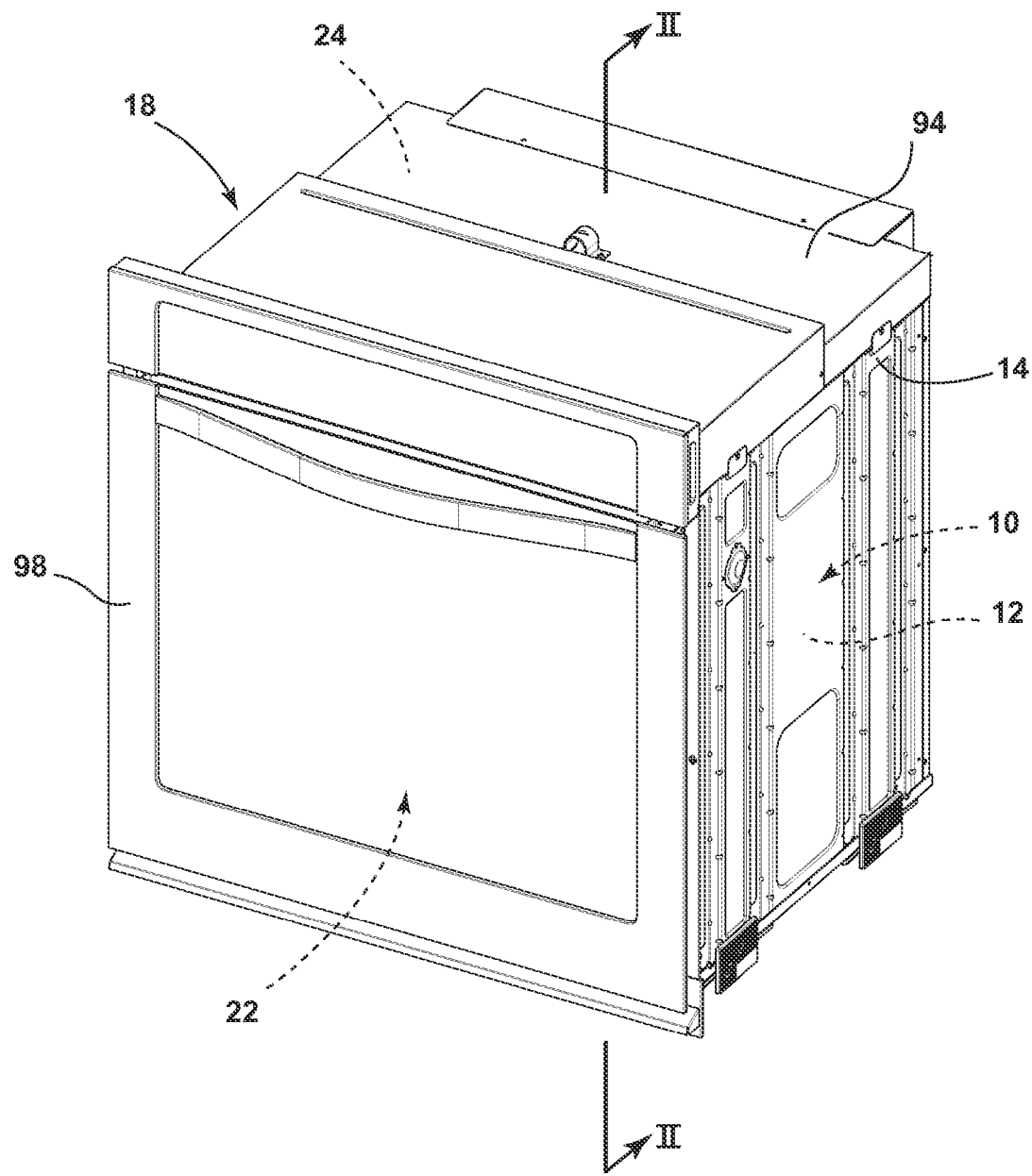
FIG. 1 is a top perspective view of an appliance incorporating an aspect of the multilayer microsphere insulation system.
Figure 2:
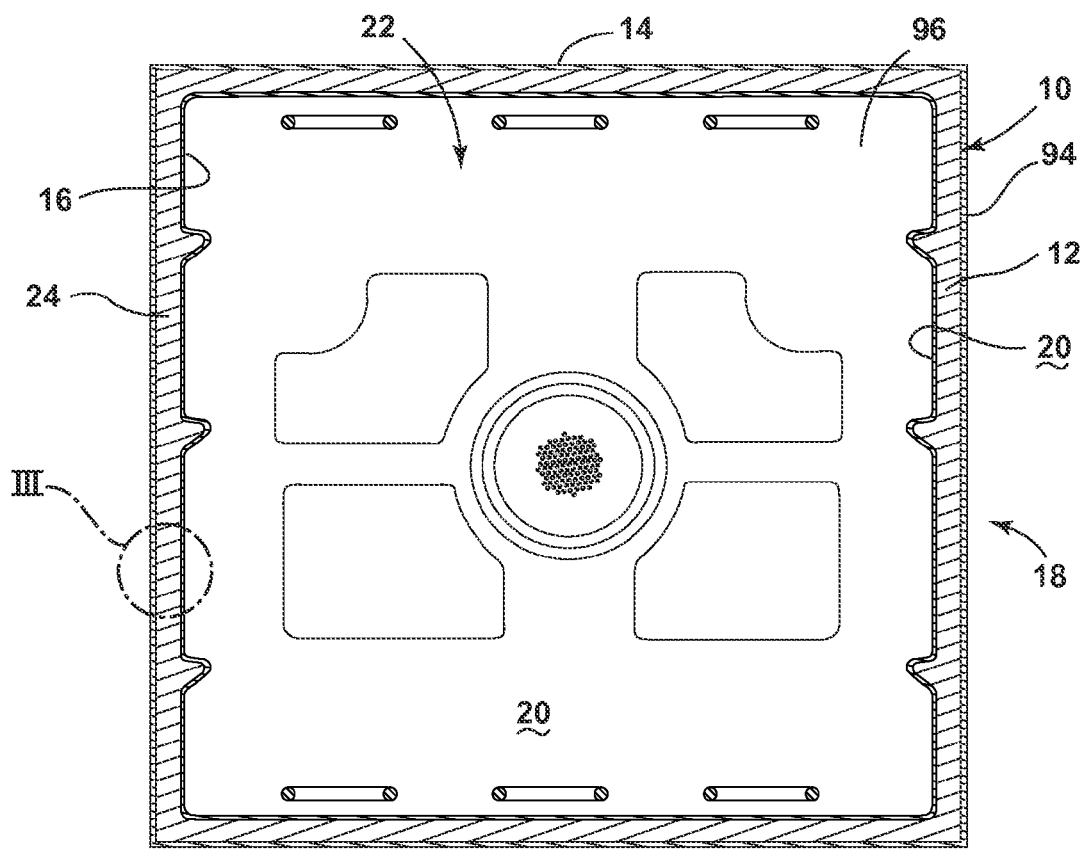
FIG. 2 is a cross-sectional view of an appliance of FIG. 1 taken along line II-II.
Figure 3:
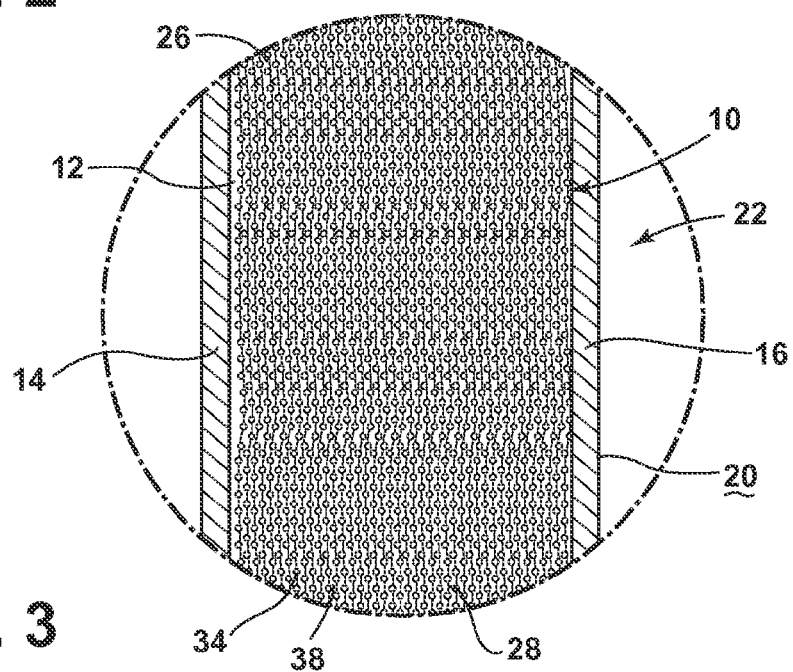
FIG. 3 is an enlarged cross-sectional view of the insulating wall of the heating appliance of FIG. 2 taken at area III.
Figure 4:
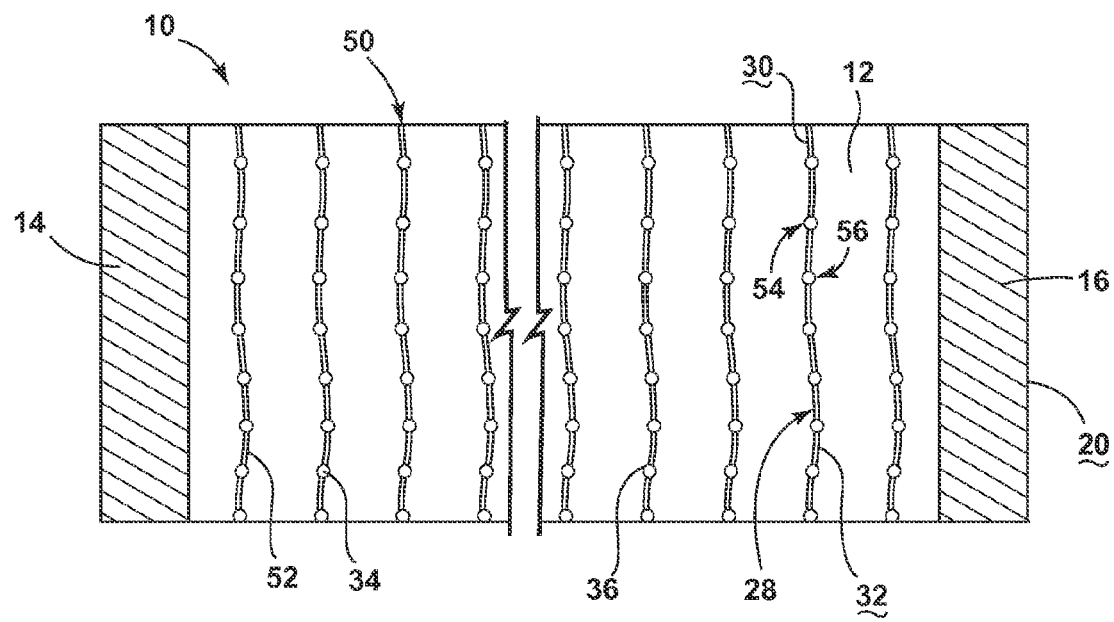
FIG. 4 is an exploded cross-sectional view of the insulating wall of FIG. 3 and showing only those microsphere sheets positioned near the outer shell and those microsphere sheets positioned near the inner shell of an appliance.
Figure 5:
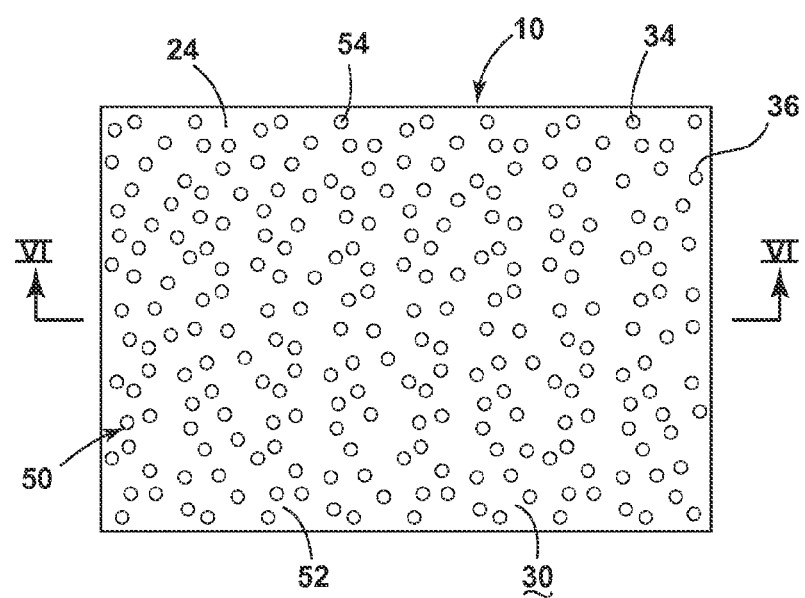
FIG. 5 is a plan view of an aspect of the multilayer microsphere insulation system.
Figure 6:
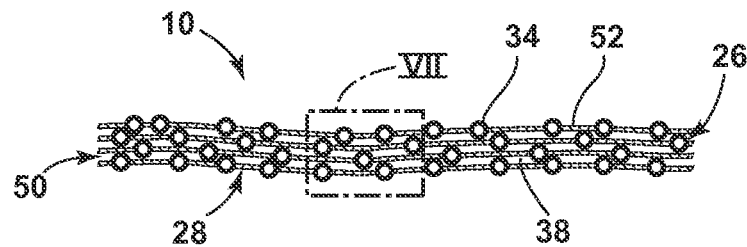
FIG. 6 is a cross-sectional view of the multilayer microsphere insulation system of FIG. 5 taken along line VI-VI.
Figure 7:
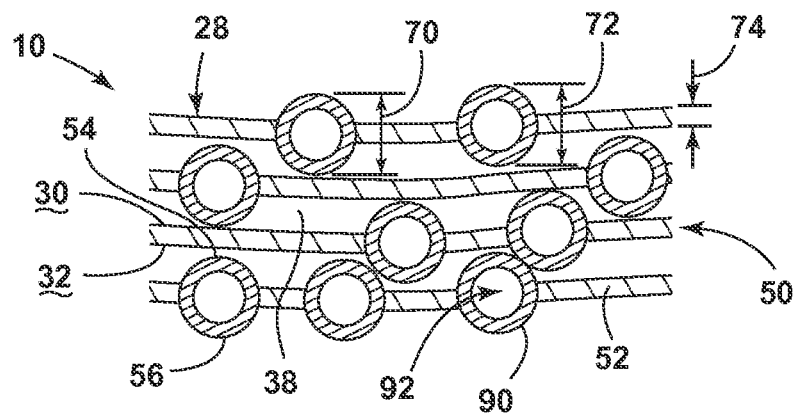
FIG. 7 is an enlarged cross-sectional view of the multilayer microsphere insulation system of FIG. 6 taken at area VII.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-7, reference numeral 10 generally refers to a multilayer microsphere insulation system incorporated within an insulating cavity 12 defined between an outer shell 14 and an inner shell 16 of an appliance, such as a heating appliance 18, according to at least one aspect. The heating appliance 18 includes an outer shell 14 and an inner shell 16, where the outer shell 14 and inner shell 16 are engaged to define an insulating cavity 12 therebetween. The inner shell 16 includes an inner surface 20 that at least partially defines an interior cavity, such as a heating cavity 22 for the heating appliance 18. A multilayer insulation member 24 includes a plurality of layers 26, where each layer of the plurality of layers 26 includes an insulative sheet 28 defining first and second surfaces 30, 32 and a plurality of microspheres 34 that are at least partially disposed within the insulative sheet 28. At least a portion of the plurality of microspheres 34 extends outward from each of the first and second surfaces 30, 32 of each insulative sheet 28 to define a plurality of microsphere protrusions 36 extending therefrom. It is contemplated that the engagement of two adjacent layers 26 of the plurality of layers 26 causes a portion of the plurality of microsphere protrusions 36 of adjacent layers 26 to engage and define a plurality of insulating air pockets 38 defined between the adjacent layers 26. The combination of the various layers 26 placed in a stacked or layered configuration forms a plurality of the insulating air pockets 38 between each of the adjacent layers 26 and substantially forms the multilayer microsphere insulation system 10.

Referring again to FIGS. 1-7, according to various embodiments, each of the layers 26 having the insulative sheet 28 and the microspheres 34 disposed therein forms a plurality of microsphere sheets 50 that can be disposed in a layered configuration to form the multilayer microsphere insulation system 10. Each of the microsphere sheets 50 includes a plurality of microspheres 34 disposed in the insulative sheet 28 that can be made of a flexible base material 52, wherein at least a portion of the plurality of microspheres 34 extends outward from the flexible base material 52 to define first and second sets 54, 56 of microsphere protrusions 36 on first and second surfaces 30, 32 of the flexible base material 52. When the microsphere sheets 50 are placed in a layered configuration, the first set 54 of microsphere protrusions 36 of a first microsphere sheet 50 substantially engages the second set 56 of microsphere protrusions 36 of an adjacent microsphere sheet 50 to define a plurality of insulating air pockets 38 defined between the first and adjacent microsphere sheets 50.

Referring again to FIGS. 3-7, within the multilayer microsphere insulation system 10, it is contemplated that the microspheres 34 can be glass microspheres 34 that are positioned in an irregular pattern within the insulative sheet 28 of the flexible base material 52. By having a substantially irregular or irregular pattern of microspheres 34 set within the insulative sheet 28, when a microsphere sheet 50 is placed in a layered configuration on an adjacent microsphere sheet 50, the irregular pattern of microspheres 34 disposed within each of the microsphere sheets 50 can cause an irregular engagement of the microsphere protrusions 36 of each of the microsphere sheets 50. This irregular engagement of the microsphere protrusions 36 of each microsphere sheet 50 can result in an irregular or substantially irregular pattern of insulating air pockets 38 defined between the adjacent microsphere sheets 50 of the multilayer microsphere insulation system 10. It is contemplated that the irregular configuration of the insulating air pockets 38 disposed between the microsphere sheets 50 can result in the multilayer microsphere insulation system 10 having a minimal number of, if any, portions of the multilayer microsphere insulation system 10 having no, or being free of, an insulating air pocket 38. In this manner, the irregular occurrences of the insulating air pockets 38 can serve to limit the thermal transfer of heat through the multilayer microsphere insulation system 10.

Referring again to FIGS. 6 and 7, it is contemplated that each microsphere sheet 50 can have a sheet thickness 70 that is substantially equal to a microsphere thickness 72, or diameter where the microsphere 34 is spherical in shape, of a single microsphere 34. It is also contemplated that the insulative sheet 28 of the flexible base material 52 can have a material thickness 74 that is less than the microsphere thickness 72. In this manner, each microsphere 34, being thicker than the insulative sheet 28 of flexible base material 52, can define two separate microsphere protrusions 36 extending out of each of the opposing first and second surfaces 30, 32 of the microsphere sheet 50. Because the microspheres 34 are irregularly disposed within the microsphere sheet 50, the microsphere protrusions 36 are also irregularly distributed throughout the opposing first and second surfaces 30, 32 of the microsphere sheet 50. In turn, because of the irregular distribution of the microsphere protrusions 36, certain microsphere protrusions 36 may engage only the flexible base material 52 of an adjacent microsphere sheet 50. While other microsphere protrusions 36 may engage both the flexible base material 52 and a microsphere protrusion 36 of an adjacent microsphere sheet 50, still other microsphere protrusions 36 may engage only another microsphere protrusion 36 of the adjacent microsphere sheet 50. Through this irregular configuration of the microspheres 34 and microsphere protrusions 36, the engagement of adjacent microsphere protrusions 36 results in the irregular placement and distribution of the insulating air pockets 38, as well as irregular and varying thickness of the plurality of insulating air pockets 38 between each microsphere sheet 50 and throughout the entire multilayer microsphere insulation system 10.

According to various embodiments, it is contemplated that the placement of microspheres 34 within one or more microsphere sheets 50 of the multilayer microsphere insulation system 10 can be in a regular pattern or substantially regular pattern. It is also contemplated that within the multilayer microsphere insulation system 10, certain microsphere sheets 50 can have regularly spaced microspheres 34 and other microsphere sheets 50 can have irregularly spaced microspheres 34. It is also contemplated that the spacing of the microspheres 34. It is also contemplated that the spacing of the microspheres 34 within a single microsphere sheet 50 can be regular in some areas and irregular in others. The exact configuration of the microsphere 34 spacing can be determined based upon the design of the appliance and the desired configuration of the insulating air pockets 38 to be formed between the microsphere sheets 50.

According to the various embodiments, the engagement between microspheres 34 of adjacent microsphere sheets 50 may only be at very small connection points, such as, for example, the very small engagement points between touching spheres. This very small engagement between microspheres 34 along with the insulating air pockets 38 formed by the microsphere sheets 50 can create a lengthy path for heat conduction. Accordingly, the microsphere sheets 50 and the insulating air pockets 38 formed irregularly therebetween forms a multilayer microsphere insulation system 10 having a highly effective insulating quality.

Referring again to FIGS. 2-7, it is contemplated that the insulative sheet 28 of the flexible base material 52 can be a silicone sheet made of pure silicone or of a silicone-based material, having the substantially the same, or the same, thermal properties as silicone. It is also contemplated that materials other than silicone can be used as the insulative sheet 28 of flexible base material 52, so long as such a material has a reflective thermal characteristic, similar to that of silicone, and can be placed in sheets to form the multilayer microsphere insulation system 10.

Referring again to FIGS. 2-7, where silicone is used as the flexible base material 52, the various microsphere sheets 50 can be held together in the layered configuration through surface adhesion, such that the microsphere sheets 50 are free of, or substantially free of, the use of adhesives. The surface adhesion of the various microsphere sheets 50 also can result in a multilayer microsphere insulation system 10 that is substantially free of fasteners, brackets, holders, or other similar mechanisms that might serve to hold the microsphere layers 26 of the multilayer microsphere insulation system 10 together beyond the adhesive forces resulting from the material characteristics of the particular flexible base material 52 incorporated within the microsphere sheet 50.

Referring again to FIGS. 2-7, it is contemplated that each of the microsphere sheets 50 can be formed by extruding a mixture of the flexible base material 52 and the microspheres 34 into each microsphere sheet 50. According to the various embodiments, it is contemplated that each of the plurality of layers 26 of the multilayer microsphere insulation system 10 can be an extruded layer of silicone and glass microspheres 34 that, when extruded, forms the various microsphere sheets 50 for the multilayer microsphere insulation system 10. According to various alternate embodiments, it is contemplated that each microsphere sheet 50 of the multilayer microsphere insulation system 10 is a spray-on layer that can be sprayed on a substrate, wherein the sprayed layer can be dried, cured, or otherwise set to form an individual microsphere sheet 50. Each subsequent microsphere sheet 50 of the multilayer microsphere insulation system 10 can be subsequently sprayed on to either the same substrate or onto the previously sprayed and cured microsphere sheet 50 to form each subsequent layer of the multilayer microsphere insulation system 10. In this manner, the spray-on insulation layers 26 can be sprayed directly onto the outer shell 14 or inner shell 16 of the heating appliance 18, according to various embodiments. It is also contemplated that the multilayer microsphere insulation system 10 can be formed through a combination of extruded microsphere sheets 50 and sprayed on microsphere sheets 50 to form the multilayer microsphere insulation system 10 for the heating appliance 18.

Referring again to FIGS. 6 and 7, it is contemplated that at least a portion of the microspheres 34 of the multilayer microsphere insulation system 10 can be hollow glass microspheres 34 having an outer wall 90 that defines an interior microsphere cavity 92. It is also contemplated that an insulating gas can be disposed within the interior microsphere cavity 92. Such an insulating gas can be an inert gas, such as argon, xenon, air, or other similar insulating gas.

According to the various embodiments, it is contemplated that the microspheres 34 for the multilayer microsphere insulation system 10 can be made of various materials that can include, but are not limited to, glass, ceramic, combinations thereof, and other similar thermally resistant materials. It is also contemplated that the microspheres 34 can be solid, hollow, or hollow and filled with a separate insulative material. According to the various embodiments, it is contemplated that different configurations of these microspheres 34 can be incorporated within the various microsphere sheets 50 of the multilayer microsphere insulation system 10. The various microsphere configurations can also be incorporated within each microsphere sheet 50 of the multilayer microsphere insulation system 10.

According to the various embodiments, the microspheres 34 can be any one of various shapes that can include, but are not limited to, spherical, oblong, irregular-shaped, polygonal, prism-shaped, combinations thereof, and other similar configurations. It is contemplated that the size of each of the microspheres 34 can vary and can have a microsphere thickness 72 within the range of nanometers to microns to fractions of a millimeter, as well as varying ranges included therebetween. Additionally, within each microsphere sheet 50, the density of microspheres 34 disposed within each microsphere sheet 50 can vary. Typically, a larger number of microspheres 34 within each microsphere sheet 50 may result in a greater number of insulating air pockets 38 disposed between each of the microsphere sheets 50. Conversely, lesser numbers of microspheres 34 within each microsphere sheet 50 will result in fewer insulative air pockets disposed between the microsphere sheets 50 within the multilayer microsphere insulation system 10. The exact density of microspheres 34, the size of microspheres 34 used, the material and configuration of the microspheres 34 can depend upon the desired configuration of each of the microsphere sheets 50 and the entire configuration of the multilayer microsphere insulation system 10.

In forming the multilayer microsphere insulation system 10, the microspheres 34 include a certain insulating property, depending on the design of the microspheres 34 used for each microsphere sheet 50. The insulative sheets 28 of flexible base material 52, such as silicone, also includes a thermally reflective property that can add to the insulating properties of the microspheres 34. When the microsphere sheets 50 are layered to form the multilayer microsphere insulation system 10, the formation of the insulating air pockets 38 provides additional insulating properties that can serve to increase the overall insulative characteristics of the combination of the microsphere sheets 50. In this manner, the overall system of the microsphere sheets 50 and the insulating air pockets 38 formed therebetween creates a multilayer insulation member 24 having increased insulation properties and having a thinner overall thickness. This thinner multilayer insulation member 24 can allow appliances, such as ovens (as exemplified in FIGS. 1 and 2), to be made with thinner insulating cavities. Therefore, more space can be devoted to creating a larger interior volume, such as a heating cavity 22, a refrigerating or freezing cavity or other appliance internal volume. Accordingly, while an oven is exemplified in FIGS. 1 and 2, the multilayer microsphere insulation system 10 can be implemented in any one or more of various appliances. Such appliances can include, but are not limited to, ovens, ranges, refrigerators, freezers, microwaves, toasters, toaster ovens, dishwashers, clothes washing/drying machines, small appliances and others to provide for thermal insulation, sound insulation or both. The multilayer microsphere insulation system 10 can also be used in various household fixtures including, but not limited to, insulation panels, cabinetry, wall/roof/floor insulation, light fixtures, sound dampening fixtures, as well as others.

Figure 8:
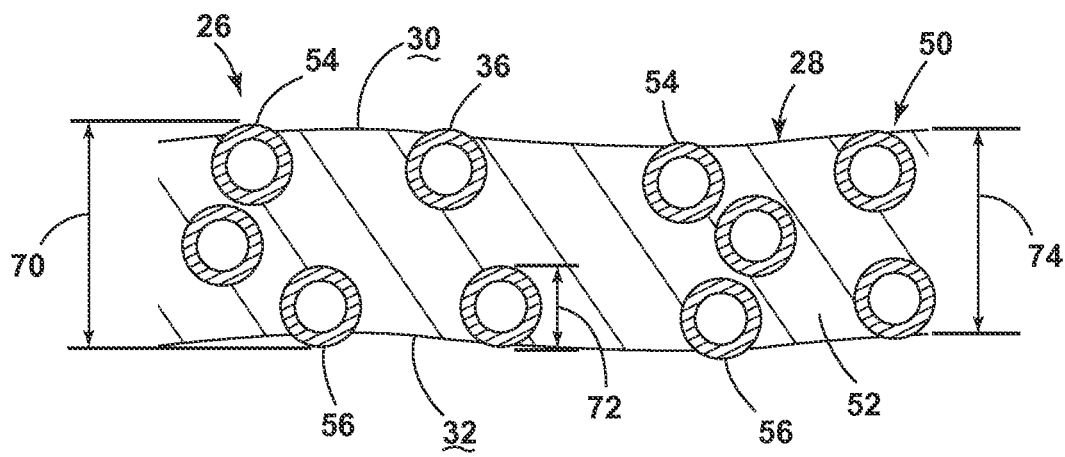
FIG. 8 is a cross-sectional view of an aspect of a microsphere layer having a thickness greater than a diameter of one of the microspheres incorporated therein.
Figure 9:
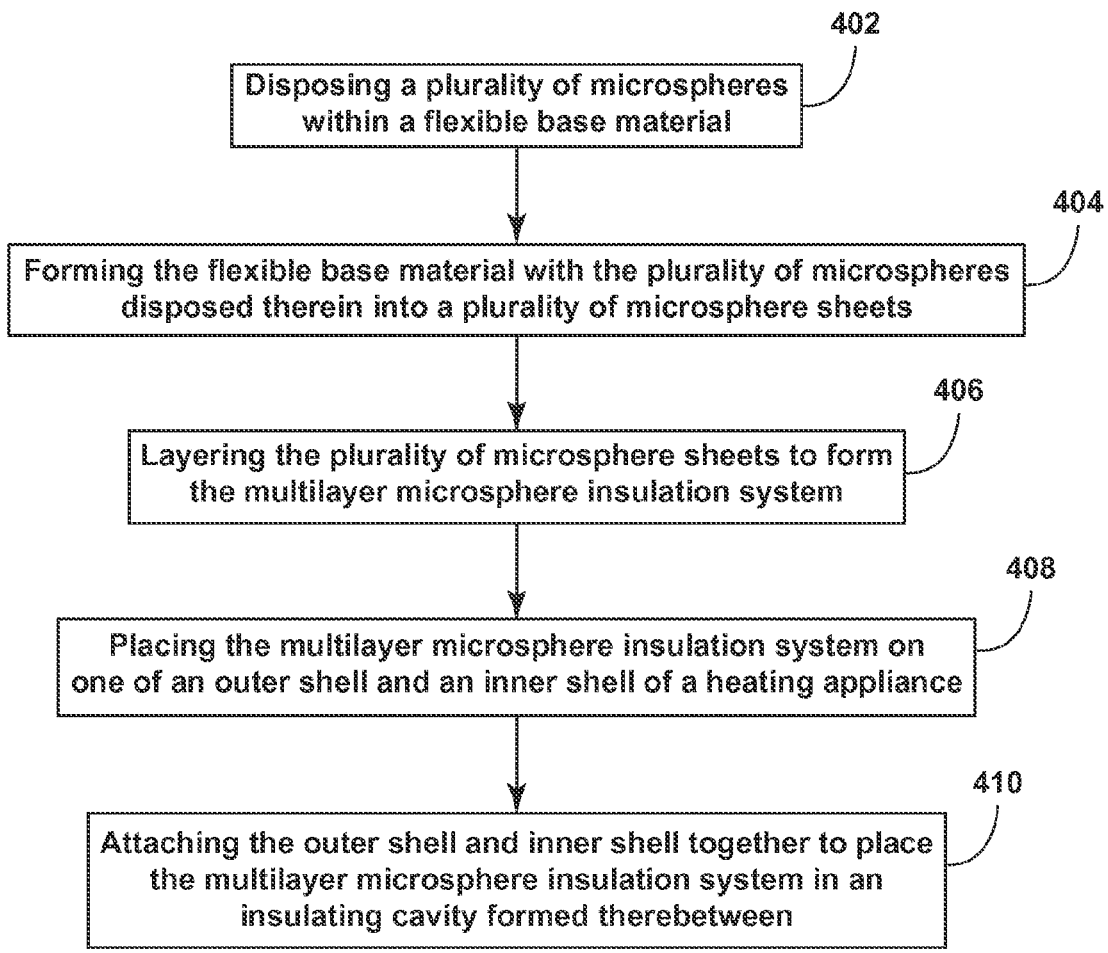
FIG. 9 is a schematic flow diagram illustrating a method for forming an insulative layer for an appliance utilizing an embodiment of the multilayer microsphere insulation system.

Referring now to FIG. 8, according to various embodiments, it is contemplated that the insulative sheet 28 of the flexible base material 52 can be made to have a material thickness 74 greater than the microsphere thickness 72 of the various microspheres 34 included within the particular microsphere sheet 50. In such an embodiment, it is contemplated that the various microspheres 34 can be positioned in various vertical ranges within the flexible base material 52. Accordingly, each microsphere 34 may form no more than one microsphere protrusion 36 extending out from either the first or second surface 30, 32 of the microsphere sheet 50. It is also contemplated that various microspheres 34 would be entirely encased within the flexible base material 52 of the insulative sheet 28 where such a microsphere 34 would not form any of the microsphere protrusions 36 of the microsphere sheet 50. According to the various embodiments, it is contemplated that the multilayer microsphere insulation system 10 can be made up of various microsphere sheets 50 having thicker or thinner layers 26 of the flexible base material 52 within which the microspheres 34 are disposed. It is also contemplated that the insulative sheets 28 of flexible base material 52 can have a variable material thickness 74 that can be thinner than a microsphere thickness 72 in one or more areas, can be the same thickness as the microspheres 34 in one or more other areas, and thicker than the microsphere thickness 72 in one or more other areas. Again, the exact configuration of the microsphere layers 26 can vary depending on the appliance design and the insulating levels needed therein.

Referring again to FIGS. 2-7, in the various embodiments where the flexible base material 52 has a material thickness 74 that is less than the microsphere thickness 72, it is contemplated that the various microspheres 34 can be set within the flexible base material 52 at various vertical positions relative to the flexible base material 52. Accordingly, some of the microspheres 34 may be set higher or lower within the flexible base material 52 such that only one side of the microsphere 34 extends from the flexible base material 52 to form a single microsphere protrusion 36. Alternatively, such an offset configuration of each microsphere 34 may form a larger microsphere protrusion 36 on one surface of the flexible base material 52 and a smaller microsphere protrusion 36 on the opposing surface of the flexible base material 52. This irregular vertical positioning of each of the microspheres 34 can further provide the irregularity discussed above as to the positioning of the various insulative air pockets between each of the microsphere sheets 50 and throughout the entire multilayer microsphere insulation system 10. Accordingly, a more pronounced microsphere protrusion 36 caused by an offset microsphere 34 within the insulative sheet 28 may result in a larger insulative air pocket proximate the more pronounced microsphere protrusion 36. Conversely, a less pronounced microsphere protrusion 36 may result in a smaller insulative air pocket. Alternatively, where the microsphere protrusion 36, regardless of its size, engages a portion of the flexible base material 52 only, it is contemplated that the flexible base material 52 may conform to the shape of the microsphere protrusion 36 such that no insulative air pocket may be formed in that particular location. As discussed above, the irregular configuration of the microspheres 34 set within the insulative sheet 28 of the flexible base material 52 serves to limit the occurrence of substantial portions between adjacent microsphere sheets 50 that are free of insulating air pockets 38.

Referring now to FIGS. 1-7 and 9, having described the multilayer microsphere insulation system 10, a method 400 is disclosed for forming the multilayer microsphere insulation system 10 to be disposed within the heating cavity 22 of a heating appliance 18, according to at least one aspect. According to the method 400, a step 402 includes disposing a plurality of microspheres 34 within a flexible base material 52. As discussed above, the flexible base material 52 can be silicone, a silicone-based material, or other similar thermally resistive material. The amount of microspheres 34 disposed within the flexible base material 52 can vary depending upon the desired density of microspheres 34 within each microsphere sheet 50 of the multilayer microsphere insulation system 10. According to the method 400, step 404 includes forming the flexible base material 52 with the plurality of microspheres 34 disposed therein into a plurality of microsphere sheets 50. As discussed above, each of the plurality of microsphere sheets 50 includes a plurality of microsphere protrusions 36 that extends outward from the surface of each microsphere sheet 50.

According to the various embodiments, each of the microsphere protrusions 36 is defined by one of the microspheres 34 disposed within the microsphere sheet 50. Depending upon the placement of the microspheres 34 within the insulative sheet 28 of the flexible base material 52, each microsphere 34 can define either one microsphere protrusion 36 extending from one surface of the microsphere sheet 50, or, opposing microsphere protrusions 36 extending out of opposing surfaces of a microsphere sheet 50. As discussed previously, material thickness 74 of the flexible base material 52 can be thicker than the microsphere thickness 72 of each microsphere 34 such that each microsphere 34 may form only one microsphere protrusion 36, and in some instances, may be entirely surrounded by the flexible base material 52 such that a particular microsphere 34 may not define any microsphere protrusions 36 of the microsphere sheet 50.

Referring again to FIG. 9, once the microsphere sheets 50 are formed, the plurality of microsphere sheets 50 can be disposed in a layered configuration to form the multilayer microsphere insulation system 10 (step 406). In this manner, a portion of the plurality of microsphere protrusions 36 of a first microsphere sheet 50 can substantially engage, or engage, a portion of the plurality of microsphere protrusions 36 of a second adjacent microsphere sheet 50. Accordingly, a plurality of insulating air pockets 38 are formed between the adjacent microsphere sheets 50.

Referring again to FIG. 9, once the multilayer microsphere insulation system 10 is formed, the multilayer insulation member 24 of the multilayer microsphere insulation system 10 that is defined by the layered microsphere sheets 50 can be placed on at least one of the outer shell 14 and the inner shell 16 of the heating appliance 18 (step 408). It is also contemplated that the multilayer insulation member 24 can be placed between the outer shell 14 and inner shell 16 such that the outer shell 14 and inner shell 16 can be attached together to form an insulating cavity 12 with the multilayer insulation member 24 disposed within the insulating cavity 12 defined between the outer shell 14 and the inner shell 16 (step 410).

According to the various embodiments, step 404 of forming the flexible base material 52 with the plurality of microspheres 34 disposed therein into the microsphere sheets 50 can be accomplished by extruding the flexible base material 52 and the plurality of microspheres 34 into the plurality of microsphere sheets 50. It is contemplated that a single sheet of the microspheres 34 and flexible base material 52 can be extruded and the elongated sheet can be cut to form the microsphere sheets 50 used for the multilayer microsphere insulation system 10. Other methods of forming the microsphere sheets 50 can be used, where such methods can include, but are not limited to, spraying the flexible base material 52 and microspheres 34, rolling the flexible base material 52 and microspheres 34, such as with a paint roller, or a brush, pouring the flexible base material 52 and microspheres 34 into a form for curing, stamping, molding, and other similar methods for forming the various microsphere sheets 50 for the multilayer microsphere insulation system 10.

According to the various embodiments, or exemplified in FIGS. 1-9, it is contemplated that the multilayer microsphere insulation system 10 can be disposed throughout the various sidewalls 94 of the heating appliance 18, including a back wall 96. Additionally, the multilayer microsphere insulation system 10 can be disposed within a door 98 of the heating appliance 18. The multilayer microsphere insulation system 10 can also be provided within mullions, dividing walls, partitions and other interior and exterior wall members of various household appliances.

The various embodiments of the multilayer microsphere insulation system 10 disclosed herein, when implemented within household appliances, such as within an insulating cavity 12 of a heating appliance 18, provide for improved insulating performance. Additionally, this improved insulating performance can be accomplished with a thinner insulating cavity 12. This thinner insulating cavity 12, in turn, provides room for additional cooking space within the heating cavity 22 of the heating appliance 18. The various methods of formation and installation of the multilayer microsphere insulation system 10, as disclosed herein, provide for a method of manufacture that can minimize waste of material due to the use of the microsphere sheets 50 over conventional batting-type insulation. These novel improvements, in turn, conserve money and resources. The method of forming the microsphere sheets 50, the multilayer microsphere insulation system 10 and the heating appliance 18, as a whole, can also decrease the time necessary to manufacture the heating appliance 18. This decrease in time is, at least in part, due to the components incorporated into the multilayer microsphere insulation system 10 and the ability to efficiently form and install these components into the multilayer microsphere insulation system 10 and the heating appliance 18.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A multilayer insulation member for an appliance, the insulation member comprising:
a plurality of microsphere sheets disposed in a layered configuration, wherein each microsphere sheet includes a plurality of microspheres disposed in a layer of a flexible base material, wherein at least a portion of the plurality of microspheres extends outward from the flexible base material to define first and second sets of microsphere protrusions on first and second sides of the flexible base material, wherein the first set of microsphere protrusions of a first microsphere sheet of the plurality of microsphere sheets engages the second set of microsphere protrusions of an adjacent microsphere sheet of the plurality of microsphere sheets to define a plurality of insulative air pockets defined between the first and adjacent microsphere sheets, and wherein the flexible base material is a silicone sheet.

2. The multilayer insulation member of claim 1, wherein the plurality of microsphere sheets are held in the layered configuration through surface adhesion and the microsphere sheets are free of the use of adhesives.

3. The multilayer insulation member of claim 1, wherein each microsphere sheet has a sheet thickness substantially equal to a microsphere thickness of a single microsphere, and wherein the flexible base material has a material thickness that is less than the microsphere thickness.

4. The multilayer insulation member of claim 1, wherein the plurality of microspheres are glass microspheres.

5. The multilayer insulation member of claim 1, wherein the plurality of microspheres within each microsphere sheet is disposed in an irregular configuration, wherein the irregular configuration of the plurality of microspheres defines the plurality of insulative air pockets in a substantially irregular air pocket configuration.

6. The multilayer insulation member of claim 1, wherein each microsphere sheet of the plurality of microsphere sheets is one of a spray-on layer and an extruded layer.

* * * * *